ROBERT P. FARNSWORTH,
INVENTOR

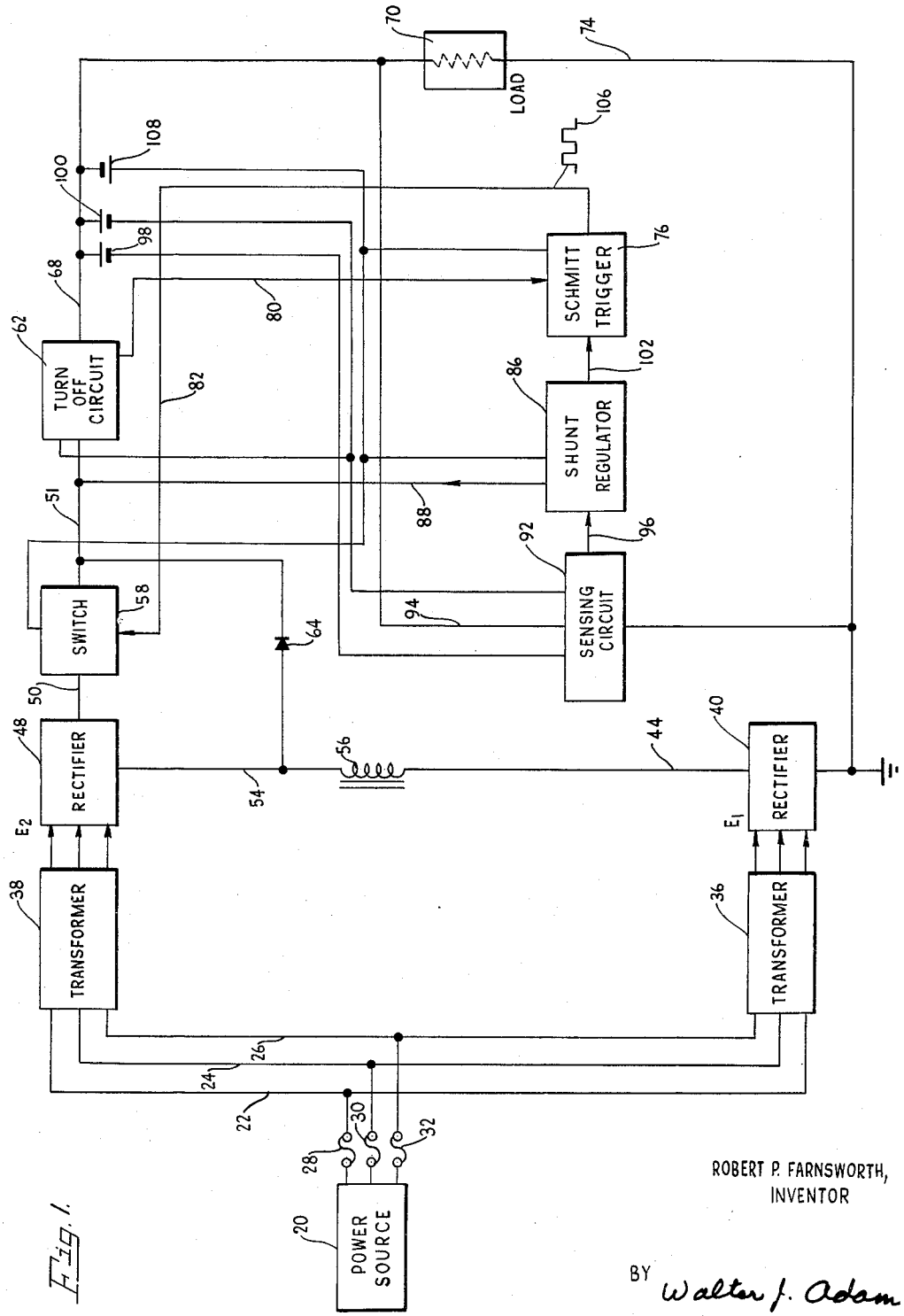

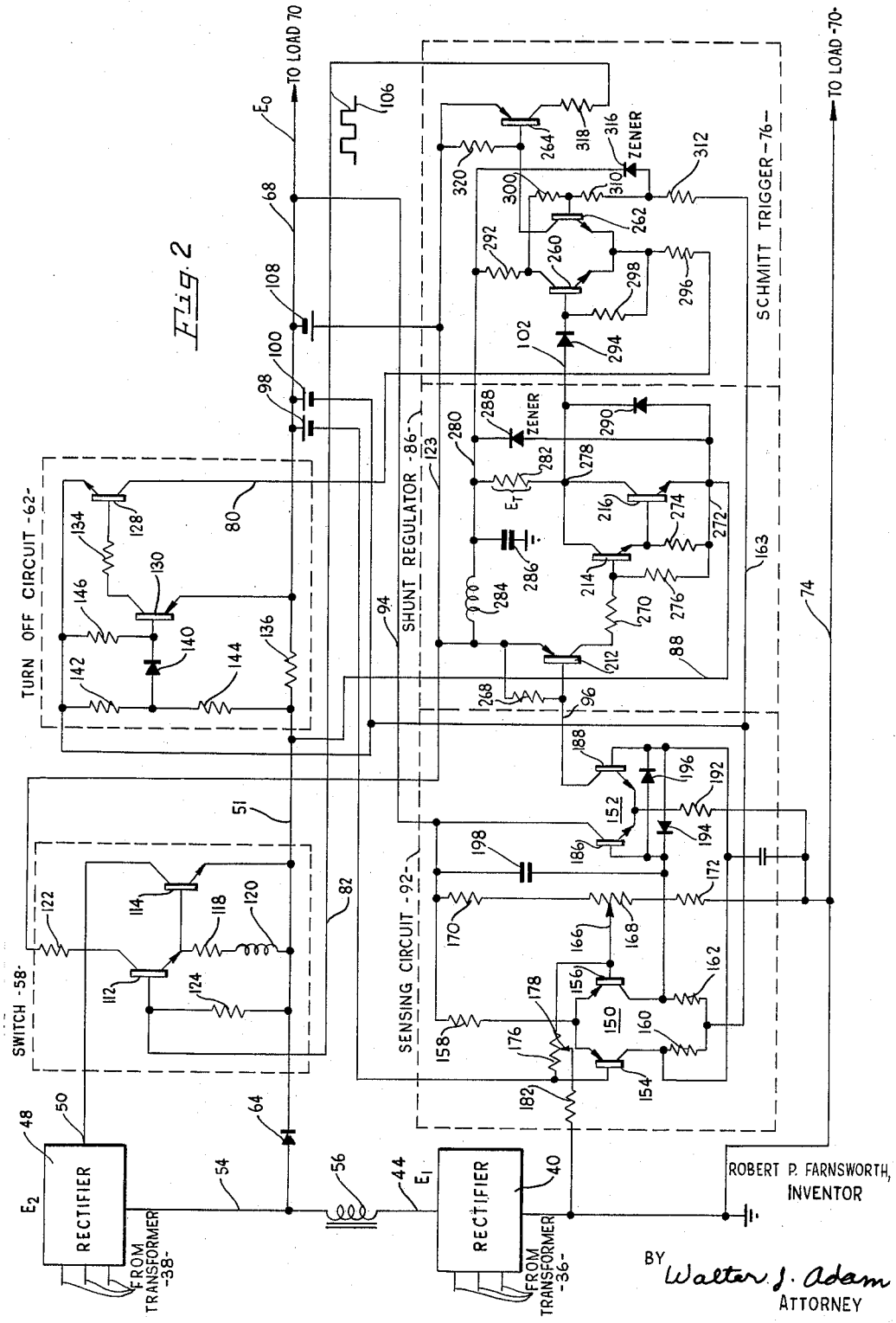

BY Walter J. Adam
ATTORNEY

June 19, 1962 R. P. FARNSWORTH 3,040,183
SWITCHED POWER SUPPLY
Filed Sept. 21, 1959 4 Sheets-Sheet 4
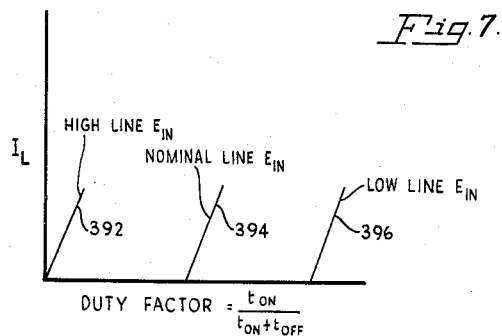
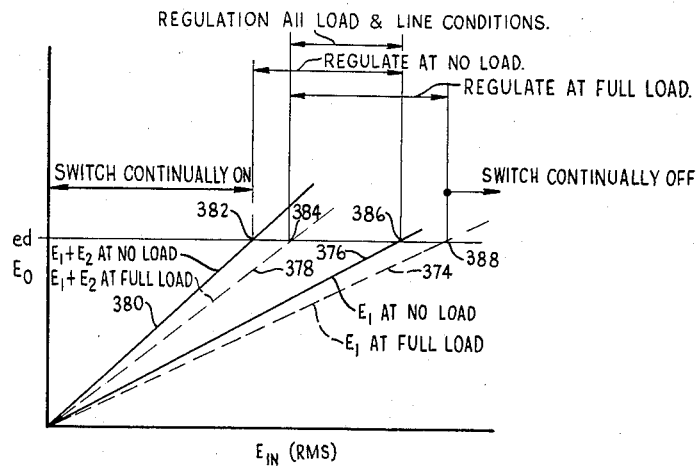
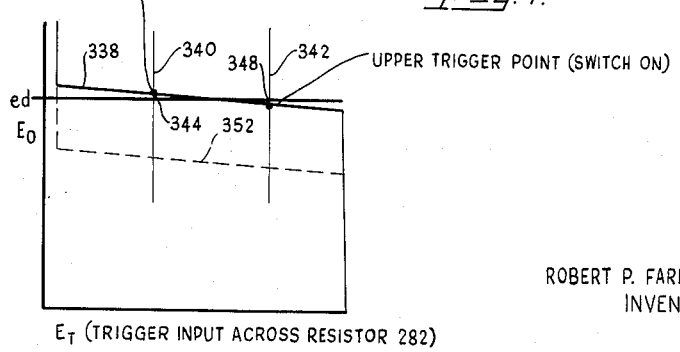
ROBERT P. FARNSWORTH,
INVENTOR
BY Walter J. Adam
ATTORNEY

United States Patent Office 3,040,183
Patented June 19, 1962

3,040,183
SWITCHED POWER SUPPLY
Robert P. Farnsworth, Los Angeles, Calif., assignor to Hughes Aircraft Company, Culver City, Calif., a corporation of Delaware
Filed Sept. 21, 1959, Ser. No. 841,924
17 Claims. (Cl. 307—77)

This invention relates to power regulating circuits and particularly to a high voltage and high current regulating circuit using transistors and switching techniques to obtain a high degree of reliability and efficiency.

Prior art power supplies which operate at high voltages with high currents have many deficiencies such as low operating efficiency and complexity of the circuits. A power supply to be satisfactory must have a high efficiency and reliability, must be relatively simple and must also have a low output impedance. These characteristics can be obtained to some degree with either a transistor or vacuum tube series regulator operating class A or shunt regulator operating class B across the output of a magnetic amplifier type series regulator.

The transistor series regulator for a 7 ampere 150 volt power supply with a 3 phase 400 cycle input line voltage regulated between 102 and 124 volts R.M.S. (root mean square) when operated at full load and maximum line voltage dissipates approximately 350 watts assuming the minimum regulator drop to be 1 volt. When utilizing vacuum tubes, the dissipation is in excess of 700 watts where a minimum of 50 volts is required across the tubes. Regulation with a magnetic amplifier would be much more efficient but these components are very large and heavy, which is a disadvantage for many applications such as in aircraft. The vacuum tube shunt regulator with magnetic amplifier control would dissipate approximately 200 watts under the above conditions, but as discussed above the magnetic amplifier has the disadvantage of excessive size and weight. An additional problem when utilizing transistors with high voltages is that overload conditions are known to damage or destroy the transistors.

A voltage regulator which regulates high voltage at high currents, which utilizes transistors to obtain the advantage of their small size and low minimum voltage requirements, and which has a very high efficiency would be very advantageous to the art. A circuit utilizing transistors as switches to control the current supplied to the load would meet these requirements if switching was performed with a low power dissipation.

Some prior art types of power supplies utilize switching techniques but require that the input voltage drops to zero as it periodically does in a rectifier, which supplies have the disadvantage in that they must use a low chopping frequency control which is the same as the input line frequency. Loop response frequency and size of inductances are both hindered by the low chopping frequency required by this arrangement. Also when the chopping frequency is equal to the line frequency as with magnetic amplifiers and some circuits utilizing voltage controlled rectifiers or thyratrons, extensive line distortion is developed. A switched power supply system utilizing a chopping frequency which is much greater than the frequency of the A.C. (alternating current) power source would eliminate these problems.

It is, therefore, an object of this invention to provide a simplified variable D.C. (direct current) power supply which has a high degree of efficiency.

It is a further object of this invention to provide a D.C. power supply utilizing transistors which include overload protection means to protect the transistors against short circuit conditions.

It is a still further object of this invention to provide a power supply utilizing switching techniques to provide high efficiency but with a high switching frequency to increase control loop response and to eliminate line distortion.

It is another object of this invention to provide a high voltage and high current D.C. power supply which may be designed with a minimum of ripple on the output voltage.

Briefly, this invention is a variable D.C. power supply which concurrently utilizes a shunt regulator as a first means of voltage regulation and a switching means as a second means of voltage regulation. A boost voltage source provides a rectified voltage below the desired output level and a switched voltage source provides a rectified voltage which is switched on and off to be combined with voltage from the boost voltage source. The boost voltage and the switched voltage, in combination with the potential change across a choke coil connected in series with the boost and switched voltage source provide a selected average output voltage.

The shunt regulator responds to the output potential through a sensing circuit to supply or absorb the current changes resulting from voltage variation across the choke coil as well as those resulting from instantaneous load and line changes to prevent load voltage variation. The shunt regulator serves a second function which is to provide a signal in proportion to the shunt current to control the switching means which connects the switched power supply in and out of the output line. The switching means is controlled by the shunt regulator through a trigger circuit which develops switching signals at an upper and a lower trigger point corresponding to shunt currents in a desired range between saturation and cutoff. The switching pulses vary in width depending upon the amount of input line voltage which is to be corrected to maintain the desired average voltage at the output. Thus, the shunt regulator regulates the output voltage by a variable shunt current to correct for high frequency load and line changes and the switching circuit in response to the trigger circuit controls the shunt regulator current to regulate the voltage on the output lead so that the shunt regulator operates in its desired range below saturation.

The choke coil limits the rate of current change during turn on or turn off of the switching circuit to prevent instantaneous current changes. The small amount of current change developed in the choke coil is absorbed or supplied by the shunt regulator so that the output voltage is not varied from its desired average and so the ripple voltage is minimum. Because the switching operation is independent of line frequency but is determined by the inductance value of the choke coil, as well as by the hysteresis delay of the trigger circuit, the switching response may be very rapid. As a result of the switch, a highly efficient power supply is provided.

The novel features which are believed to be characteristic of the invention, both as to its organization and method of operation, together with further objects and advantages thereof, will be better understood from the following description considered in connection with the accompanying drawing in which like characters refer to like parts and in which:

FIG. 1 is a schematic block and circuit diagram of the power supply system in accordance with this invention;
FIG. 2 is a schematic circuit diagram of a portion of the power supply system of FIG. 1;
FIG. 3 is a graph of shunt current versus output voltage showing the operation region of the shunt regulator circuit of FIG. 1;
FIG. 4 is a graph of Schmitt trigger input voltage versus power supply output voltage for explaining the switching operation of the power supply of FIG. 1;

FIG. 7 is a graph of duty factor versus load current for explaining the switching operation during changes of load current and input line voltage; and FIG. 8 is a graph of input line voltage versus regulated output voltage to further explain the operation of the power supply system of FIG. 1 for different load and input line conditions.

Figure 5:
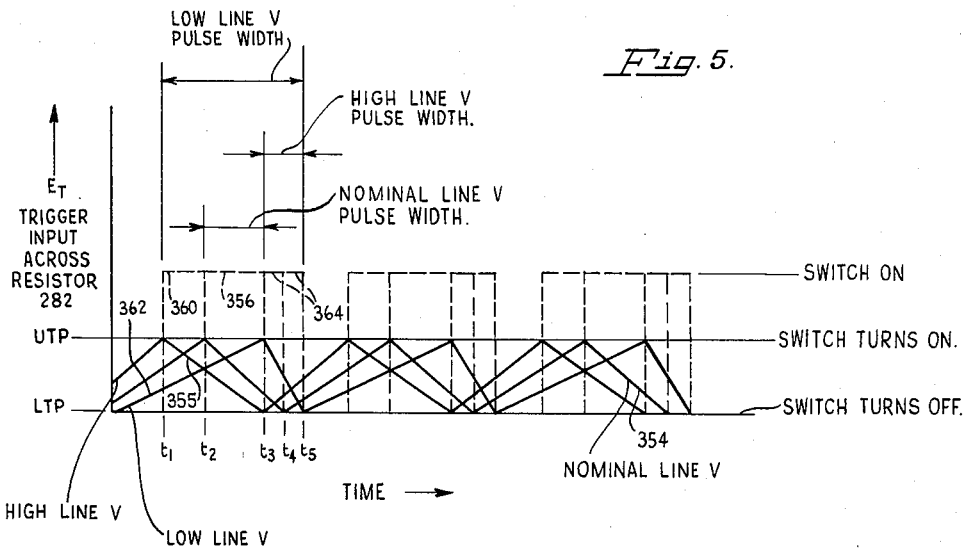
FIG. 5 is a graph of Schmitt trigger input voltage versus time for explaining the control of the switching pulses applied to the switch of FIG. 1.

Referring first to FIG. 1 which is a block and circuit diagram of the power supply system in accordance with this invention, the general arrangement of the system will be described. A power source 20 provides three phase A.C. (alternating current) power to leads 22, 24, and 26 through overload fuses or mechanical disconnects 28, 30, and 32. A three phase transformer 36 to provide a source of boost voltage and transformer 38 to provide a source of switched voltage are each connected to the leads 22, 24, and 26 to receive and alter the voltage level of A.C. power therefrom. The transformers 36 and 38 may be types other than three phase transformers. A rectifier 40, which may be a conventional diode arrangement to provide full wave rectification, is connected to the transformer 36 to receive the transformed A.C. power and supply to a lead 44, a rectified voltage which is the boost supply voltage $E_1$ with reference to ground. The transformer 36 and rectifier 40 will be referred to as the boost supply source for the purpose of description of the regulator system of this invention.

A rectifier 48 which may be similar to the rectifier 40 is provided with three terminals receiving the A.C. power signal from the transformer 38 and providing full wave rectification to the A.C. signal. The rectifier 48 has one terminal connected to supply a rectified voltage which is the switched supply voltage $E_2$ to a lead 50 with the other terminal of the rectifier referenced to a lead 54. The transformer 38 and the rectifier 48 will be referenced as the switched power supply for the purpose of description of this invention. An inductor or choke coil 56 is connected between the leads 44 and 54 to control the output current and voltage during switching, as will be explained subsequently. The transformer 38 and the rectifier 48 operate as the switched voltage supply. For example, for a 150 volt power supply with a nominal line voltage of 112 volts, the boost voltage $E_1$ may be 133 volts and the switched voltage $E_2$ may be 50 volts.

A switch 58 is provided to control the voltage derived from the rectifier 48 and when the switch is closed to apply the voltage $E_1$ and $E_2$ from the rectifiers 40 and 48 as well as the voltage across the choke coil 56 from the lead 50 to a lead 51 and to turn off circuit 62. A diode 64 has an anode to cathode path connected between the leads 54 and 51 so that when the switch 58 is closed the diode 64 is biased out of conduction and when the switch 58 is open, the diode 64 is biased into conduction to pass the boost voltage $E_1$ from the rectifier 40 in combination with the potential developed across the choke coil 56 to subsequent circuit elements. The turn off circuit 62 is arranged to be responsive to load current passed from the lead 51 to an output lead 68 and to a ground lead 74 through the load 70. The turn off circuit 62 provides a signal to a Schmitt trigger circuit 76 through a lead 80 so as to provide a bias potential for preventing a switching pulse from being applied through a switching lead 82 to the switch 58 when an overload condition is present to thereby open the switch. It is to be noted at this time that the choke coil 56 is only required to be connected in series with the power source $E_1$ and, for example, may be connected between the rectifier 40 and ground to provide similar operation.

A shunt regulator 86 is provided to control the voltage on the output lead 68 by varying the shunt current flowing through a lead 88 from the shunt regulator 86 to the lead 51. A sensing circuit 92 is provided to respond to the voltage on the output lead 68 through a lead 94 and to control through a lead 96, the conduction of the shunt current through the shunt regulator 86. The sensing circuit 92 is connected to receive a referenced potential from the ground lead 74, a minus 6 volt battery 98 and a minus 19 volt battery 100, both batteries being connected for a reference to the output lead 68. The shunt regulator 86 not only controls shunt current through the lead 88 but also controls the Schmitt trigger circuit 76 through a lead 102 in response to the shunt current. The trigger circuit 76 in response to the shunt regulator 86 controls the switch 58 by developing pulses as shown by a waveform 106 and by varying the width of the pulses. The switch 58 in response to the presence or the absence of a pulse of the waveform 106 respectively turns the switched voltage $E_2$ on and off the lead 51. The switched voltage $E_2$ is combined with the boost voltage $E_1$ and is continually supplied to the lead 50 whether the switch 58 is turned on or off. The choke coil 56 develops a potential as the switch 58 is turned on and off which is respectively subtracted or added to the voltages $E_1$ plus $E_2$ or the voltage $E_1$. Thus, the average voltage on the lead 51 and the output lead 68 is controlled by the width of the switching pulses applied by the switch 58 in response to the shunt regulator 86 so that the shunt regulator 86 operates in a desired range below saturation, as will be discussed subsequently. A plus 10 volt battery 108 is also provided to apply a bias voltage to the trigger circuit 76, the shunt regulator 86 and the switch 58. The turn off circuit 62 is supplied with a bias potential from the minus 19 volt battery 100.

Referring now to FIG. 2 which is a detailed circuit diagram showing a portion of the power regulation system of FIG. 1, the circuits of the system will be described in further detail. The switch 58 includes two npn transistors 112 and 114 arranged in an emitter follower configuration. The collector of the transistor 114 receives the switched voltage $E_2$ combined with the boost voltage $E_1$ from the lead 50 and its emitter applies the voltage to the lead 51 when the transistor 114 is biased to its conductive state. The transistor 112 applies a potential from its emitter to the base of the transistor 114 for biasing the transistor 114 into conduction when the transistor 112 is conductive. The transistor 112 also has its emitter connected to the lead 51 by way of an emitter follower resistor 118 and an inductor 120 which acts to provide quick turn off of the transistor 114 when transistor 112 becomes nonconductive. The plus 10 volt battery 108 applies a bias potential to the collector of the transistor 112 through a current limiting resistor 122 and a plus 10 volt bias line 123. The base of the transistor 112 is coupled to the lead 51 through a bias resistor 124 and is responsive to be biased into conduction by the pulses of the waveform 106 on the switching lead 82, which pulses are formed by the trigger circuit 76.

The turn off circuit 62 includes a normally conducting npn transistor 128 and a normally conducting pnp transistor 130 with the collector of the transistor 130 controlling the potential on the base of the transistor 128 through a current limiting resistor 134. The emitter of the transistor 130 is responsive to the potential on the output lead 68 and the base of the transistor 130 is connected through a diode 140 to a junction between a resistor 142 and a resistor 144, which comprise a voltage divider with the ends respectively coupled to the minus 19 volt battery 100 and to the lead 51. A current sensing resistor 136 is connected between the lead 51 and the output lead 68 to provide a voltage drop when current is flowing therethrough to bias the emitter of the transistor 130 to a lower potential than its base during overload, thus biasing the transistor 130 and in turn the transistor 128 out of conduction. The minus 19 volt battery 100 applies a bias potential to the emitter of the transistor 128 and to the base of the transistor 130 through a biasing resistor 146. The diode 140 absorbs the current passing through the resistor 146 when the transistor 130 is in a nonconductive state. The collector of the transistor 128 is connected to the lead 80 to apply a potential to prevent switching pulses being formed by the trigger circuit 76 during an overload condition, thus turning the switch 58 to an off condition.

The sensing circuit 92 includes a first differential amplifier 150 and a second differential amplifier 152 which are cascaded so that the second differential amplifier is responsive to the output of the first to provide a highly reliable and sensitive circuit. The first differential amplifier 150 includes pnp transistors 154 and 156 having their emitters connected in common through a resistor 158 to the lead 94 which, in turn, receives the potential from the output lead 68. The resistor 158 has a relatively large value so as to pass a substantially constant current. The minus 19 volt battery 100 applies a bias potential through a minus 19 volt lead 163 and through signal developing resistors 160 and 162 to the respective collectors of the transistors 154 and 156. The minus 6 volt battery 98 applies a reference potential to the base of the transistor 154 and a variable tap 166 which obtains voltage from a potentiometer 168 and applies a signal voltage to the base of the transistor 156. The variable tap 166 is utilized to select a desired increment of the output voltage $E_o$ on the output lead 68. The potentiometer 168 forms a voltage divider with a resistor 170 having an end connected to the lead 94 and with a resistor 172 having an end connected to the ground lead 74. The voltage divider 170, 172, and 168 biases the transistor 156 so that a voltage change at the output lead 68 causes the transistor 156 to change conduction a fraction of the change of conduction of the transistor 154. An adjustable bias arrangement is established by a resistor 176 providing a current path between the base of the transistors 154 and 156 and having a variable tap 178 connected to ground through a current limiting resistor 182.

The second differential amplifier circuit 152 includes transistors 186 and 188 both of the npn type, and having emitters connected in common through a resistor 192, which has a relatively large value to the ground lead 74. The resistor 192 passes a substantially constant current so that only a differential signal is amplified by the transistors 186 and 188. The transistor 186 is responsive through its base to the signal on the collector of the transistor 156 and the transistor 188 is responsive through its base to the signal on the collector of the transistor 154. The transistors 186 and 188 are responsive to both the differential and common mode potentials developed in the differential amplifier 150 with the common mode potential being substantially eliminated by the resistor 192 maintaining a substantially constant current, as will be discussed in further detail subsequently. A diode 194 and a diode 196 are arranged in circuit relation between the bases of the transistors 186 and 188 with opposite polarity to respectively provide a charging and a discharging path during turn-on and turn-off of the system. The collector of the transistor 186 is connected directly to the lead 94 to receive bias from the output potential on the output lead 68 and a control signal is applied through the collector of the transistor 188 to the shunt regulator circuit 86. To increase the loop response of the system, the base of the transistor 186 is coupled to the lead 94 through a capacitor 198 for passing high frequency signals and the base of the transistor 188 is coupled to the ground lead 74 through a capacitor 200, also, for passing high frequency signals.

The shunt regulator 86 controls the shunt current passed to the lead 51 through the shunt lead 88 in response to the signal received from the sensing circuit 92 through the lead 96 so as to remove voltage variation on the output lead 68. Included in the shunt regulator circuit 86 are a pnp transistor 212 and two npn transistors 214 and 216. The transistor 212 is responsive through its base to the potential on the lead 96. The plus 10 volt lead 123 applies a bias potential to the emitter of the transistor 212. The base and the emitter of the transistor 212 are connected by biasing resistor 268 and the collector is connected to the base of the transistor 214 by way of a current limiting resistor 270. The transistor 214 has an emitter connected to a lead 272 through a resistor 274 and its base referenced to the lead 272 through a biasing resistor 276 with the lead 272 being connected to the shunt current lead 88. The emitter of the transistor 214 applies a potential to the base of the transistor 216 and the collector of the transistor 214 receives a potential from a junction point 278. The collector and emitter of the transistor 216 form a shunt current path between the junction point 278 and the shunt current lead 88. For developing a trigger voltage $E_T$ indicative of the shunt current passing through the transistor 216, the junction point 278 is connected to a lead 280 through a current sensing resistor 282. The shunt current is supplied to the lead 280 from either an inductor 284 which has an end connected to the plus 10 volt lead 123 or from a capacitor 286 which is coupled between the lead 280 and ground. The potential $E_T$ developed by the shunt current across the sensing resistor 282 triggers the trigger circuit 76 to opposite states. The current through the inductor 284 is substantially constant and flows to the capacitor 286 and through the transistor 216. To limit the potential across the transistor 216 and across current sensing resistor 282 when the capacitor 286 discharges during turn-off of the system, a zener diode 288 is provided with the cathode connected to the lead 280 and the anode connected to the lead 272. Also, to provide a path for charging of the capacitor 286 during turn-on of the regulating system, a diode 290 is provided with the cathode connected to the lead 102 which, in turn, is connected to the junction point 278 and with the anode connected to the lead 272.

The Schmitt trigger circuit 76 includes two npn transistors 260 and 262 and a pnp transistor 264 which form a two state device that responds to the signal applied to the base of the transistor 260 on the lead 102 from the shunt regulator 86. The potential on the lead 280 is applied as a bias to the collector of the transistor 260 through a resistor 292. A diode 294 is arranged in the base of the transistor 260 with a polarity preventing current passing back into the shunt regulator 86. The emitters of the transistors 260 and 262 are connected in common to the lead 80 through a resistor 296 for being controlled by the turn-off circuit 62. The base of the transistor 260 is connected to the emitters of the transistors 260 and 262 through a biasing resistor 298. A reference potential is applied to the base of the transistor 262 from a junction between a resistor 300 and a resistor 310 that in combination with a resistor 312 provide a series voltage divider between the collector of the transistor 260 and the minus 19 volt lead 163. A zener diode 316 has the anode connected between the resistors 310 and 312 and the cathode connected to the lead 280 so that the trigger circuit 76 is responsive to the potential developed across the shunt current sensing resistor 282. The transistor 264 is switched on and off through the base by the potential developed on the collector of the transistor 262. The plus 10 volt lead 123 applies a bias potential to the emitter of the transistor 264 and biases the base of the transistor 264 through a biasing resistor 320. Switching pluses, as shown by waveform 106, are applied from the collector of the transistor 264 to the lead 82 through a current limiting resistor 318.

Referring now to FIGS. 1 and 2, the operation of the system will be explained in further detail. The average output voltage $E_o$ may tend to change because of a variation of the input line voltage or a variation of the load 70. However, the shunt regulator and the switching operation prevent a change of the average voltage $E_o$ and maintain the amplitude of the ripple voltage on the output lead 68 at a desired minimum. A rise of voltage on the output lead 68 is applied directly to the base of the transistor 154 through the minus 6 volt battery 98 and a fraction of the voltage rise is applied to the base of the transistor 156 through the voltage divider 170, 168, and 172. This voltage rise causes the collector of the transistor 154 to go negative and the collector of the transistor 156 to become less negative so as to develop a differential voltage between the two collectors. There is also a common mode signal developed on the collectors of the transistors 154 and 156 which changes the collector voltage in a common direction. The base of the transistor 186 then becomes slightly negative and the base of the transistor 188 becomes negative a greater amount to give a net result of decreasing conduction of the transistor 188. Because the resistor 192 passes a substantially constant current, the effect of the common mode signal is eliminated and only the differential signal resulting in a decrease of current through the transistor 188 is present. The potential on the lead 96 thus increases so that the transistor 212 conducts less, resulting in a fall of potential on the base of the transistor 214 and a decrease of conduction of current therethrough. As a result, the potential on the base of the transistor 216 falls and shunt current through the collector to emitter path is decreased resulting in a drop of trigger voltage $E_T$ and a voltage rise at the junction point 278 and on the lead 102. Because the current is substantially constant through the inductor 284, the decreased amount of shunt current through the resistor 282 is passed to the capacitor 286. The decrease of the shunt current on the lead 88 decreases the current through the load 70 causing the voltage on the output lead 68 to fall to its desired level, thus providing shunt regulation of the output voltage $E_o$.

This voltage rise on the lead 102, which is a measure of the decrease of shunt current and the voltage drop across the resistor 282 also causes an increased conduction through the transistor 260 resulting in a fall of voltage at the collector and a fall of voltage at the base of the transistor 262. When the voltage rises at the base of the transistor 260 to a level above the potential on the emitter, which is the upper trigger point or voltage of the trigger circuit 76, the transistor 260 is biased into conduction and the voltage falls on the base of the transistor 262 to bias it out of conduction. Because the resistor 296 passes substantially constant current, the transistor 262 operates as an emitter follower to determine the potential on the emitter of the transistor 260 so that the transistor 260 is responsive to the potential across the current sensing resistor 282. The potential change required for the potential on the lead 102 to bias one or the other of the transistors 260 or 262 out of conduction is the hysteresis delay of the trigger circuit 76. This condition with the transistor 262 biased out of conduction results in an increase of potential on the base of the transistor 264 biasing it out of conduction to provide a fall of potential on the switching lead 82 as shown by a negative portion of the waveform 106. Thus, the transistor 112 of the switch 58 is biased out of conduction because of a fall of potential at the base and in turn the transistor 114 is rapidly biased out of conduction as a result of a fall of potential caused by the inductor 120 changing polarity. The switch is thus in an off or open condition and boost voltage $E_1$ plus the voltage across the choke coil 56 is supplied to the output lead 68 from the boost voltage source of the rectifier 40 through the diode 64. Thus, the current maintained by the choke coil decreases and the potential falls at the output lead 68 during the negative pulse of the waveform 106 by the amount needed to cause the conduction of the shunt regulator 86 to increase.

When the switch 58 is turned off, the potential on the lead 54 goes positive with reference to the potential at lead 44 as a result of the current through inductor 56 changing. This potential condition biases the diode 64 into conduction. When the voltage decreased at the base of the transistor 216, current through the lead 88 decreased. The inductor 284 maintains a substantially constant current, and current therethrough is passed to charge the capacitor 286 rather than as shunt current through the lead 88. Thus, within the limits of regulation of the shunt regulator 86, current is varied to the load 70 to maintain a desired voltage on the output lead 68.

When the switch 58 is turned off, the choke coil 56 prevents a sudden change of current being passed to the output lead 68. However, the current through the coil 56 falls in a substantially linear manner at a rate determined by the inductance value of the coil. This fall of current as well as rises of current when the switch is turned on is compensated for by the shunt current of the shunt regulator 86 so that a large variation of voltage is not developed on the output lead 68.

In response to a fall of potential at the output lead 68, which may be caused by an increase in load current or a line voltage decrease or by a current decrease through the choke coil 56, the circuits operate in a similar but opposite manner. The differential amplifiers 150 and 152 respond so that the potential decreases on the lead 96. The shunt regulator 86 responds so that the shunt current through the current sensing resistor 282 increases, the potential drop across the resistor 282 increases, and the potential on the lead 102 decreases. The increased shunt current is supplied by the capacitor 286 and causes the potential on the output lead 68 to rise.

The transistor 260 is biased out of conduction as the lower trigger voltage is reached and the transistor 262 is biased into conduction. The transistor 264 is thus biased into conduction and a positive pulse of the waveform 106 is formed on the switching lead 82. In turn, the transistors 112 and 114 of the switch 58 are biased into conduction by the positive switching pulses of the waveform 106. Thus, boost voltage $E_1$ plus switched voltage $E_2$ minus the voltage developed across the choke coil 56 are supplied through the transistor 114 to the output lead 68. The voltage developed across the inductor 56 reverses polarity so that it is negative on the lead 54 and positive on the lead 44. Thus, the voltage on the lead 51 is more positive than on the lead 54 and the diode 64 is biased into a nonconductive state to prevent current from passing from the lead 51 to the lead 54. As discussed previously, this switched voltage provides a means to correct for load and line variations by varying the width of the switching pulses of the waveform 106. The switching action in the absence of load or line changes continues in response to a rise and fall of current through the choke coil 56.

The switching operation continues in a similar manner as the current through the current sensing resistor 282 increases and decreases in response to the sensing circuit 92 correcting the voltage on the output lead $E_o$. The Schmitt trigger circuit 76 responds to the shunt current through the sensing resistor 282 to develop switching pulses which control the output voltage $E_o$ so that the shunt regulator 86 operates in its nonsaturation region, as will be discussed further subsequently. Thus, the shunt regulator 86 operates independently of the Schmitt trigger circuit 76 and the switch circuit 58, these circuits acting to correct the output voltage $E_o$ in response to the shunt current. It is to be noted that the switching operation is automatically initiated during start up of the system because $E_o$ is below normal causing the switch to turn on, causing the output voltage to rise above the selected output voltage, $E_o$. The voltage $E_1$ plus $E_2$ is always greater than the selected average output voltage, $E_o$. When the voltage rises 10 to 12 millivolts above the selected output voltage $E_o$ of 150 volts, for example, the change of shunt current causes the trigger circuit 76 to turn the switch 58 off at its lower trigger point and the switching operation continues, as discussed above. This very small 10 to 12 millivolt change of the output voltage $E_o$ on the output lead 68 is the only voltage ripple developed by this system during normal operation. It is to be noted that for some conditions where a large line voltage variation is present, the switched voltage $E_2$ may be larger than the boost voltage $E_1$. However, the boost voltage $E_1$ must be less than or equal to the selected output voltage $E_o$ and $E_1$ plus $E_2$ must be greater than the selected output voltage $E_o$.

The turn off circuit 62 operates during an overload condition to control the trigger circuit 76 by biasing the transistor 128 out of conduction so that the voltage rises on the lead 80. The trigger circuit 76 then develops a low switching potential of the waveform 106 and the switch is turned off and protected from excessive current. When the overload condition occurs, the switch is turned off, all transistors of the circuit are protected and the current rises until the fuses 28, 30, and 32 of FIG. 1 disconnect the power source 20 from the load. Thus, the power supply circuitry is protected during an overload condition. In operation, the transistors 128 and 130 are normally conducting so that the lead 80 is connected to the minus 19 volt battery 100 to bias the emitters of the transistors 260 and 262 in a normally operating condition as discussed above. The voltage drop across the resistor 136 is normally less than that across the resistor 144 causing the transistor 130 to remain in a conductive state. As current rises through the lead 68 to an overload condition, the voltage drop across the resistor 136 becomes equal to or greater than that across the resistor 144. Thus, the transistor 130 is biased between emitter and base to a nonconductive condition and in turn the transistor 128 is biased into a nonconductive state. This disconnects the battery 100 from the lead 80 and the potential rises at the emitters of the transistors 260 and 262 biasing them out of conduction. This condition renders the transistor 262 nonconductive and turns the switch off by rendering the transistors 112 and 114 nonconductive. The voltage $E_2$ from the rectifier 48 is then disconnected from the lead 51 and only boost voltage $E_1$ plus the voltage developed across the choke coil 56 is supplied to the output lead 68. Therefore, overload current is prevented from passing through the switch 58. In the event of a momentary overload which does not activate the fuses 28, 30, and 32, the circuit is restored to normal operation when the current through the resistor 136 falls to the normal operating range.

Figure 3:
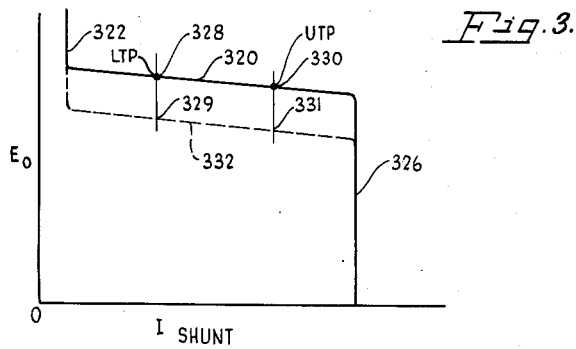

Referring now to FIG. 3 which is a graph showing the variation of the shunt current through the shunt lead 88 versus the output voltage $E_o$ on the output lead 68, as well as referring to FIG. 2, the operation of the shunt regulator 86 will be further explained. As may be seen by FIG. 3, the shunt regulator conventionally is operable only within a limited range on a line 320 between the low current line 322 and a saturation line 326. The shunt regulator of this invention operates normally between the points 328 and 330. The shunt current at the point 328 is the current passed through the shunt lead 88 at the lower trigger point of the trigger circuit 76 at which the switch 58 turns off. The current at the point 330 is the shunt current passed through the lead 88 at the upper trigger voltage or point of the trigger circuit 76 at which the switch 58 turns on. It is to be noted that the operating region between points 328 and 330 are in the center of the operating line 320. The current variation between the points 328 and 330, as maintained by the trigger circuit 76 controlling the switch circuit 58, controls high frequency variation of load current on the output lead 68 caused either by load or line changes, by input voltage ripple and by current change through the choke coil 56. However, sudden load changes of current or voltage of the power source may cause the shunt regulator to momentarily operate outside of the region of the points 328 and 330, as will be discussed subsequently. Thus, the shunt regulator 86 normally operates only in its desirable region below saturation because it further controls the switch 58 through the Schmitt trigger circuit 76. Generally, the switch 58 controls the quiescent current to the load 70 by correcting low frequency load or line changes and the shunt regulator 86 controls the high frequency transient variations caused by load or line changes.

An operating line 332, which is shown in phantom, indicates operation of the circuit at another output voltage $E_o$ between a point 329 and 331 which voltage is selected by moving the tap 166 in the sensing circuit 92.

Referring now to FIG. 4, which is a graph showing the Schmitt trigger input voltage $E_T$ developed across the resistor 282 versus the output voltage $E_o$, as well as referring to FIG. 2, the operation of the shunt regulator 86 to control the trigger circuit 76 will be further explained. The desired voltage $e_D$ is shown on an output voltage line 338 and the hysteresis characteristics of the trigger circuit 76 is indicated by trigger lines 340 and 342 which define the lower trigger voltage and upper trigger voltage for any selected output voltage $E_o$. When the trigger voltage $E_T$ across the shunt current sensing resistor 282 falls to a lower trigger point 344 as a result of a rise of output voltage $E_o$ and a decrease of shunt current, the trigger circuit 76 changes its state so that the positive switching pulse passed to the switch 58 is terminated. The switch 58 is thus opened to reduce the voltage on the output lead 68 so that only the switched power supply $E_1$ and the voltage across the coil 56, which changes in polarity to add its voltage to $E_1$, is supplied to the output lead 68.

When the output voltage $E_o$ on the output lead 68 falls to a level as indicated by upper trigger point 348, the trigger circuit 76 is biased to its opposite state so that a switching pulse is passed to the switch 58. Thus, the switch 58 is closed or turned on so that the switched power supply voltage $E_2$ is combined with the boost voltage $E_1$ and the voltage across the choke coil 56 which reverses polarity is subtracted from $E_1$ plus $E_2$ to raise the voltage on the output lead 68 to the selected output voltage. The output voltage $E_o$ continually varies between the points 344 and 348 as the switching action controls the average output potential, thus providing only a small ripple above and below the desired output voltage $e_D$. A line 352 shown in phantom indicates the operating range with a lower output voltage $E_o$ setting as selected by the variable tap 166 of the sensing circuit 92.

Referring now to FIG. 5 which is a graph of the Schmitt trigger input voltage $E_T$ or the voltage developed across the shunt current sensing resistor 282 versus time, as well as referring to FIG. 2, the variation of the pulse width of the waveform 106 to control the voltage on the output lead 68 in response to variations of input line voltage will now be explained. The voltage $E_T$ developed by the shunt current passing through the shunt current sensing resistor 282 is shown for a nominal line, high line, and a low line voltage, $E_{IN}$, which is the R.M.S. voltage at the output terminals of the power source 20 of FIG. 1. The trigger voltage for a nominal line voltage is shown as the waveform 354 and rises in value between pulses until the upper trigger point is reached and a pulse is formed to turn the switch on, and falls in value during the occurrence of the switching pulse until the lower trigger point is reached and the pulse is terminated to turn the switch off. At time $t_2$ the voltage $E_T$ reaches the upper trigger point and the trigger circuit 76 develops a switching pulse 356 which turns the switch on passing the switched voltage $E_2$ to the output lead 68. The voltage $E_T$ then falls until time $t_4$ which is the lower trigger point of the trigger circuit 76 causing the trigger circuit to be biased to its opposite state, and terminating the pulse 356. Thus, during a nominal line voltage condition, the switching pulse 356 has a width between times $t_2$ and $t_4$. During a low line voltage condition the trigger input $E_T$ as shown by a voltage waveform 355 rises rapidly to the upper trigger point at time $t_1$ to develop a trigger pulse 360 to open the switch 58. Because of the low line voltage condition, the voltage $E_T$ falls at a slow rate until time $t_3$ at which time the lower trigger point is reached and the pulse of the waveform 355 is terminated to turn the switch off. For a high line voltage condition, the voltage $E_T$ is shown by a waveform 362 and rises slowly when the switch is off to reach the upper trigger point at time $t_3$, causing the trigger circuit 76 to change its state and develop a pulse 364 to close the switch 58. Because of the high line voltage condition, the voltage $E_T$ of the waveform 362 falls rapidly to the lower trigger point to bias the trigger circuit 76 out of conduction at time $t_5$ forming a very narrow pulse 364. Thus, it may be seen that a change of input line voltage or of load current causes the shunt current of the shunt regulator 86 to vary the switching pulse width so as to maintain the output voltage $E_o$ within the operating range of the shunt regulator 86.

Figure 6:
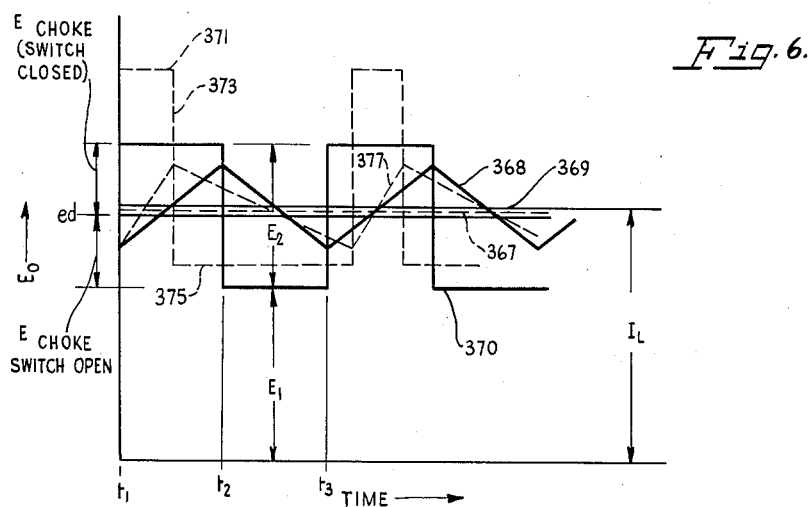
FIG. 6 is a graph of output voltage, load current and choke coil current versus time to explain the operation of the choke coil in response to the switching action of the circuit of FIG. 1.

Referring now to FIG. 6 which is a graph of output voltage $E_o$ versus time and showing the current through the choke coil, as well as referring to FIG. 2, the operation of the system to correct for load or line changes will be explained in further detail. A waveform 368 shows the rise and fall of choke current $I_c$ through the choke coil 56 into the output lead 68 in response to the switching action of switch 58. Waveform 370 shows a nominal line and load condition. At time $t_1$, the switch 58 is closed or turned on to cause the voltage on the output lead 68 to rise. When the switch is closed the output voltage $E_o$ is equal to $E_1$ plus $E_2$ minus $E_{CHOKE}$, which is the voltage across the choke coil 56, thus providing the selected output voltage $e_D$ indicated by line 367. The current through the choke coil 56 of the waveform 368 then increases in a substantially linear manner until the output voltage $E_o$ reaches a value so that the shunt current through the shunt current sensing resistor 282 causes $E_t$ to fall to the lower trigger point. Thus, at time $t_2$ the trigger circuit 76 is biased to its opposite state of conduction so that no pulse is passed to the switch 58 and the switch opens. When the switch opens the output voltage $E_o$ is equal to $E_1$ plus $E_{CHOKE}$ to give the desired output voltage $e_D$. Thus, the polarity of the choke coil 56 reverses when the switch 58 changes between on and off conditions to provide the desired output voltage. When the switch 58 is off, the choke current $I_c$, as shown by a waveform 368, decreases until the lower trigger point is reached by the trigger voltage $E_t$. Thus, at time $t_3$ the trigger circuit 76 is biased to its opposite state and a pulse of the waveform 370 is developed by the switch 58. The current through the load $I_L$ which is shown by a waveform 369 is an average value as supplied by the increase and decrease of choke current $I_c$. The increase and decrease of choke current $I_c$ is compensated for by the shunt regulator 86 so that the instantaneous load current $I_L$ is constant as shown by the waveform 369.

For a high line condition or a fall of load current $I_L$, as shown by a waveform 367, the system operates in a similar manner. For a high line condition, the voltage $E_1$ and $E_2$ increases so that the voltage $E_o$ has an amplitude indicated by 371 when the switch is closed. A positive pulse 373 has a very narrow width and a negative pulse 375 has a very wide width so that the voltage areas above and below the selected voltage $e_d$ are equal. Under these conditions, the voltage $E_{CHOKE}$ is much greater when the positive pulse 373 is present than when the negative pulse 375 is present. The choke current $I_c$ varies under this condition as shown by a waveform 377. Thus, the average voltage $e_d$ is maintained constant on the output lead 68 by the switching action.

During a decrease of line voltage or an increase of load current, the system operates in a similar but opposite manner. The positive pulses become wider and the negative pulses become narrower so that the selected voltage $e_d$ is maintained on the output lead 68. In the absence of load or line changes, the pulses may have a constant width, the trigger circuit 76 responding to the rise and fall of current through the choke coil 56. It is to be noted that under any of these normal conditions, the shunt regulator 86 is maintained in its desired operating range as explained in relation to FIG. 3.

Referring now to FIG. 7 which is a graph showing duty factor of the pulses versus load current $I_L$ for various input line voltages $E_{IN}$, as well as referring to FIG. 2 the operation of the switch 58 to maintain the average output voltage $E_o$ at a selected value will now be explained in further detail. The duty factor is defined as the time on divided by the time on plus the time off for the switch 58, the time on being the time when a positive pulse of the waveform 106 is passed to the switch 58 and the time off being the time between pulses of the waveform 106. A curve 392 shows a variation of the duty factor with load current for an input voltage $E_{in}$ which is a high line voltage condition as shown in FIG. 6. For example, the power supply of this invention may be designed to supply a desired output voltage $e_D$ of plus 150 volts on the output lead 68 and the high line design voltage may be 150 volts R.M.S. The low line voltage may be designed for 95 volts R.M.S. As discussed above, a high line and a low line design voltage of this order is well within the capabilities of conventional power sources. From the nominal line voltage $E_{IN}$ of 115 volts R.M.S. the variation of the duty factor with load is shown by curve 394 and for a low line voltage $E_{IN}$ the variation of the duty factor with load current is shown by a curve 396. It may be seen that a change of the input line voltage causes the duty factor to vary to a much greater extent than a change of current through the load. However, whether the output voltage $E_o$ varies as a result of load change or input line voltage, or both, the duty factor of the switch 58 is changed to correct the output voltage $E_o$ to the desired voltage $e_D$. It is to be again noted that in the absence of load changes or changes in the output voltage $E_{IN}$, the circuit operates with a constant duty factor as indicated in FIG. 6.

Referring now to FIG. 8 which is a graph showing input line voltage $E_{in}$ versus output voltage $E_o$ at various load conditions, as well as referring to FIG. 2, the range of regulation of the system of this invention will be further explained. A line 374 shows the boost voltage $E_1$ at full load conditions and a line 376 shows the boost voltage $E_1$ at no load conditions for any selected output voltage $E_o$. Also, a line 378 shows the value of the boost voltage $E_1$ plus the switched voltage $E_2$ at full load conditions and a line 380 shows voltage values for the boost voltage $E_1$ plus the switched voltage $E_2$ at no load conditions for any selected output voltage $E_o$. At a selected output voltage $e_D$, the ranges of operation of this circuit can thus be seen. Between a point 384 and a point 386, the power supply system performs voltage regulation for all load and line conditions because this region is between the voltage $E_1$ and $E_2$ at full load when the switch 58 is on and the boost voltage $E_1$ at no load when the switch is off. Under conditions of no load, the system will regulate for an input line voltage $E_{in}$ variation between a point 382 and the point 386. Under full load conditions, the system will regulate for a line voltage $E_{in}$ variation between the points 384 and a point 388. For an input line voltage $E_{in}$ below point 382 the switch 58 is continually on and for an input line voltage $E_{in}$ greater than at the point 388 the switch is continuually off. Thus, it can be seen that the regulating system of this invention may operate over a very large range of line voltage $E_{in}$ which is easily obtainable by a conventional transformer and rectifier combination for the boost supply and the switched supply.

Referring now to FIGS. 1 and 2, the function of the choke coil 56 will be further discussed. The choke coil 56 limits the frequency of switching by limiting the rate of current change therethrough so as to prevent a rapid change of current during the delay time of the elements of the switching circuit 58. If it were not for this time delay, the choke coil 56 would not be required because the switch would instantaneously operate at an extremely high frequency to maintain a minimum of ripple on the output lead 68. However, the delay which is conventionally present in any switching circuit would allow very large voltage fluctuations on the output lead 68. The system with the choke coil 56 and the shunt regulator to correct for the small current change through the coil develops an instantaneous selected voltage on the output lead 68 with a minimum of ripple. It is to be again noted that the shunt regulator 86 absorbs and supplies shunt current to overcome the current increase and decrease of the choke coil 56. Also, rapid switching without a choke coil would result in a large power dissipation because of the limited switching speed of switch 58. The circuit of this invention with a controlled switching rate results in a minimum of power dissipation and a high efficiency. It has been found that with the system of this invention supplying 7 amperes at 150 volts, the dissipation is approximately 50 watts, which is a great improvement over prior art power supplies, as discussed previously.

One feature of this invention is that the ripple of the output voltage $E_o$ may be easily designed to be limited to a desired maximum amplitude. As seen in FIG. 3 a small ripple is present in the output voltage $E_o$ while the system is normally regulating in the desired shunt regulator range between the points 328 and 330. Both the value of inductance of the choke coil 56 and the hysteresis voltage of the Schmitt trigger circuit 76 determine the operating range of the shunt regulator 86 and thus the ripple of the output voltage $E_o$. A decrease of inductance of the choke coil 56 increases the frequency of the ripple of the output voltage $E_o$, but allows the system to handle a larger rapid change of load current. A decrease of hysteresis voltage of the Schmitt trigger circuit 76 increases the frequency and decreases the amplitude of the ripple of the output voltage $E_o$ but increases the power dissipation because of the imperfections of the switch 58. Therefore, the ripple of the output voltage $E_o$ may be reduced to a desired minimum by varying the size of the choke coil 56 and varying the characteristics of the Schmitt trigger circuit 76, within the limits of switching delay of the switch 58. It is to be noted that the switching frequency is a function of the inductance value of the choke coil 56 and is independent of the frequency of alternation of the input source 29, as contrasted to the undesirable condition with conventional switched power supplies.

Because the choke coil 56 limits the choke current to a designed rate of change, the inductance value of the coil affects the maximum rate of change of load current which the system will handle and remain in regulation. The system at high rates of change of load current greater than the rate of change of choke current is limited to the amount of current the shunt regulator can supply or absorb. Thus, the shunt regulator handles high frequency transients of relatively small magnitude and large load changes at a low frequency are handled by the switch. When the rate of change of load current is less than or equal to the rate of change of choke current, the system continues to switch and regulate for any load change, although the switch is on for a longer period when the rate of change of load current is increasing and approaches the rate of change of choke current. However, load conditions resulting from load or line changes typically have large current changes for lower rates of change and small changes of load current for higher rates of change. Thus, the system in accordance with this invention regulates in a highly reliable and efficient manner for all but the most severe load and line rates of change. It is to be again noted that at constant loads and line conditions, the shunt regulator handles all of the current change resulting from the switching operation. Also, if the load current changes at the same rate as the rate of choke current, then the shunt regulator current remains constant and no switching takes place.

Thus, the power supply system of this invention has a high efficiency because a boost supply is utilized and pulsing techniques combine the switch voltage $E_2$ with the voltage across the choke coil to provide a desired output voltage. Also the system is highly reliable because a first loop, including the shunt regulator and second loop including the trigger circuit 76 and the switch 58, operates concurrently to maintain the selected output voltage. The system also will regulate over a wide range of input line voltage change by properly selecting the value of the elements as discussed above.

Thus, there has been described an improved high voltage, high current power supply system which has a high efficiency because a switch supply is combined with a boost supply only as required to give the desired output voltage and an inductor is provided to control the switching rate to overcome delay of the switching elements. The supply includes a shunt regulator loop which controls the current through the load and includes the switching loop which controls the switched supply to control potential on the output lead so that the shunt regulator operates in its desired region. Further, the system includes overload protection means which protects all transistor elements of the supply during overload allowing mechanical or fused disconnects to operate without destroying the power supply. The system is highly efficient because controlled switching of transistors between their saturation and cut off region is utilized and is highly flexible because of its ability to handle a large range of load and line variations.

What is claimed is:

1. A power supply circuit for regulating a potential applied to a load, said circuit comprising a voltage source including switching means for applying either a first or a second potential to said load, and regulating means coupled to said load for supplying current thereto, said regulating means including a trigger circuit coupled to said switching means for responding to said current supplied to said load from said regulating means to alternately apply said first and second potentials to said load.

2. A power supply circuit for regulating a potential applied to a load, said circuit comprising a voltage source including means to develop a first and a second potential, switching means coupled to said voltage source for applying either said first or said second potential to the load, and shunt regulating means coupled to said load for supplying shunt current thereto, said shunt regulating means including a trigger circuit coupled to said switching means for responding to said shunt current to control said switching means to alternately apply said first and second voltages to said load.

3. A voltage regulator for supplying a regulated voltage to a load, said regulator comprising means to supply a first voltage coupled to the load, means to supply a second voltage coupled to said first means and to said load, switching means coupled between said second means and said load, current limiting means coupled in series with said first and second means, voltage sensing means coupled to said load, current regulator means coupled to said sensing means and to said load, and trigger means coupled between said regulator means and said switching means, whereby said regulator means and said switching means operate concurrently to maintain the regulated voltage at said load.

4. A power supply circuit for regulating a potential applied to a load to a desired value of voltage so as to overcome variations of input line voltage and of load current, said circuit comprising a voltage source responsive to the input line voltage and including means to develop a first, second and third potential, said first potential being equal to or less than the desired value of voltage, said second potential being greater than said desired value of voltage, said third potential varying with the variations of input line voltage and load current, switching means for selectively applying a potential developed from said first and third potentials and a potential developed from said first and second potentials minus said third potential to the load, and shunt regulating means coupled to said load for responding to the potential thereat and supplying shunt current thereto in response to the load or line changes, said shunt regulating means having an operating range above a cut-off condition and below a current saturation condition, said shunt regulating means including a trigger circuit coupled to said switching means for responding to said shunt current to develop switching pulses having a width indicative of the rate of change of said shunt current to alternately apply said first and second voltages to said load so as to maintain said desired value of voltage at said load and to maintain said shunt regulating means responsive to operate in its operating range.

5. A circuit for supplying voltage through a load line to a load, said load being coupled to a reference source, said circuit comprising a first source of rectified voltage coupled to said reference source, a second source of rectified voltage coupled between said first source and said load line, switching means coupled between said second source and said load line for being turned on or off to respectively apply the voltages from said first and second source and the voltage from said first source to said load line, an inductor coupled between said first and second sources, diode means coupled from between said inductor and said second source to said load line, sensing means coupled across the load, a shunt regulator coupled to said sensing means and to said load line for passing shunt current thereto, said shunt regulator having a desired operating region below saturation, a trigger circuit coupled to said shunt regulator and coupled to said switching means for applying switching pulses thereto, said pulses having a width indicating the rate of change of said shunt current, said switching means responding to said switching pulses to control said switching means so as to maintain said shunt regulator in its desired region below saturation.

6. A power supply for supplying a desired average voltage level above a reference potential to a load, said supply comprising a first source of rectified voltage coupled to said load and developing a first voltage level above the reference potential, said first voltage level being equal to or less than the desired voltage, a second source of rectified voltage coupled to said first source and to said load for developing a second voltage level which when combined with said first voltage level develops a third voltage level greater than said desired voltage level, switching means coupled between said second source and said load for connecting or disconnecting said second voltage level from said load terminal, inductance means coupled in series with said first and second source of rectified voltage for developing a potential changing in polarity relative to said load as said switching means connects and disconnects said second voltage level from said load, voltage sensing means coupled to said load, shunt regulator means coupled between said sensing means and to said load for supplying shunt current thereto, and pulse forming means coupled between said shunt regulator means and said switching means for responding to said shunt current to develop pulses having a width indicative of the rate of change of said shunt current, said pulses alternately switching said second voltage level on and off of said load.

7. A power supply system for applying a regulated voltage to a load, said system comprising a first means to supply a first voltage having a level equal to or less than the regulated voltage, a second means to supply a second voltage which when combined with said first voltage provides a level greater than said regulated voltage, said second means being coupled to said first means and to the load, an inductor coupled between said first and second means for developing a third voltage having a first or a second polarity, a unidirectional current control element coupled from between said inductor and said second means to said load, switching means coupled between said second means and said load for alternately applying and removing said second voltage from said load terminal and for alternately reversing the polarity of said third voltage, voltage sensing means coupled to said load, a shunt regulator coupled to said sensing means and to said load to pass a shunt current thereto, and a trigger circuit coupled between said shunt regulator and said switching means to respond to said shunt current to control said switch to alternately apply and remove said second voltage to said load and to reverse the polarity of said third voltage to said load.

8. A voltage regulator for applying a regulated voltage through a load to a source of reference potential, said regulator comprising a power source, a first voltage rectifying means coupled to said power source and to said source of reference potential to develop a first voltage, an inductor coupled to said first rectifying means to develop a second voltage, a second voltage rectifying means coupled to said power source and to said inductor to develop a third voltage, a diode coupled from between said inductor and said second rectifying means to said load, switching means coupled between said second rectifying means and said load, said switching means applying said first and third voltages minus said second voltage therethrough to said load when a switching pulse is applied thereto and controlling said second rectifying means to apply said first and second voltage to said load through said diode in the absence of a switching pulse, sensing means coupled from between said load and said switching means to said source of reference potential to develop a control voltage in response to the voltage aplied to said load, a shunt regulator coupled to said sensing means and between said switching means and said load to pass shunt current to said load in response to said control voltage, said shunt current varying at a rate indicative of variation of voltage at said load, and a bistable trigger circuit coupled between said shunt regulator and said switching means to respond to the shunt current to develop switching pulses having a time duration indicative of the rate of change of said shunt current, to alternately connect and disconnect the voltage from the second rectifying means to said load to maintain the regulated voltage thereat.

9. A voltage regulating circuit for supplying a regulated voltage to one end of a load, the other end of the load being coupled to a source of reference potential, said circuit comprising a first voltage source coupled to said source of reference potential to develop a first voltage, an inductor coupled to said first voltage source, a second voltage source coupled to said inductor and to said load to develop a second voltage and form a first supply path for applying said first and second voltages to said load, switching means coupled between said second voltage source and said load, a diode coupled from between said inductor and said second source to said load to provide a second supply path to apply said first voltage to said load, sensing means coupled between said load and said source of reference potential, shunt regulator means coupled to said sensing means and to said load for supplying shunt current thereto in response to the voltage supplied to said load, and a bistable trigger circuit coupled between said shunt regulator means and said switching means to respond to said shunt current to alternately supply voltage to said load through said first path or said second path.

10. A power supply circuit for applying a voltage to a load, said supply circuit comprising a power source, first rectifier means coupled to said power source for developing a first voltage, second rectifier means coupled to said power source for developing a second voltage, an inductor coupled between said first and second rectifier means for developing a third voltage, switching means coupled bteween said second rectifier means and said load, diode means coupled from between said inductor and said second rectifier means to said load, sensing means coupled to said load and responsive to the output voltage, a shunt regulator coupled to said sensing means and to said load, said shunt regulator supplying varying current to said load to correct for voltage variations thereon, trigger means coupled to said shunt regulator and to said switching means, said regulator including elements which are capable of being saturated with current and having a desired operating range of shunt current below saturation of said elements, said trigger means responding to the shunt current passed to the load to control said switching means so that said first voltage and said third voltage or said first and second voltages minus said third voltage is applied to said load, thereby maintaining said output voltage at a level so that said shunt regulator operates in its desired operating range of shunt current.

11. A voltage regulator for supplying a regulated voltage to a load, said regulator comprising means to supply a first voltage coupled to the load, means to supply a second voltage coupled to said first means and to said load, switching means coupled between said second means and said load, current limiting means coupled in series with said first and second means, voltage sensing means coupled to said load, current regulator means coupled to said sensing means and to said load, trigger means coupled between said regulator means and said switching means for selectively turning said switching means on and off, and overload protection means coupled between said switching means and said load and to said trigger means, whereby said regulator means and said switching means operate concurrently to maintain the regulated voltage at said load, and said overload protection means controls said trigger means to turn said switching means off during the occurrence of an overload condition.

12. A circuit for supplying a regulated voltage to a first end of a load, a second end of the load being coupled to a source of reference potential, said circuit being responsive to overload conditions, said circuit comprising a first voltage source coupled to said source of reference potential to develop a first voltage, an inductor coupled to said first voltage source, a second voltage source coupled to said inductor and to the first end of said load to develop a second voltage and to form a first supply path for applying said first and second voltages to said load, switching means coupled between said second voltage source and said first end of said load, a diode coupled from between said inductor and said second source to said load to provide a second surplus path to apply said first voltage to said load, sensing means coupled between the first end of said load and said source of reference potential, shunt regulator means coupled between said sensing means and said first end of said load for supplying shunt current thereto in response to the voltage applied to said load, a bistable trigger circuit coupled between said shunt regulator means and said switching means to respond to said shunt current to alternately supply voltage to said load through said first path and said second path, and overload protection means coupled between said switching means and the first end of the load and to said bistable trigger circuit to apply a potential thereto to control said switching means so as to supply voltage through said second supply path to said load during the occurrence of an overload condition.

13. A voltage regulator for supplying a regulated voltage to a load, said regulator comprising means to supply a first voltage coupled to the load, means to supply a second voltage coupled to said first means and to said load, switching means coupled between said second means and said load, current limiting means coupled in series with said first and second means, overload protection means coupled between said switching means and said load, voltage sensing means coupled to said load, current regulator means coupled to said sensing means and to said load for supplying shunt current thereto, said regulator means including a current sensing resistor for developing a voltage indicative of the shunt current supplied to said load terminal, trigger means coupled between said regulator means and said switching means for turning said switching means on and off in response to the voltage indicative of the shunt current supplied to said load, and overload protection means coupled between said switching means and said load and to said trigger means, whereby said regulator means and said switching means operate concurrently to maintain the regulated voltage on said load and said overload protection means controls said trigger means to turn said switching means off during the occurrence of an overload condition.

14. A power supply system for supplying a load voltage to a load, said system comprising an alternating power source, a first means coupled to said alternating power source to supply a first voltage having a level equal to or less than the load voltage, a second means coupled to said alternating power source to supply a second voltage which when combined with said first voltage provides a voltage level greater than said load voltage, said second means coupled to said first means and to the load, an inductor coupled between said first and second means to limit the rate of change of current supplied to said load, a unidirectional current control element coupled from between said inductor and said second means to said load, switching means coupled between said second means and said load, voltage sensing means coupled to said load terminal and including a first and a second interconnected differential amplifier, a shunt regulator coupled to said sensing means, said shunt regulator having a current source coupled to a first path including a capacitor and to a second path to said load, said second path including a current sensing resistor, and a trigger circuit coupled between said shunt regulator and said switching means to respond to the rate of change of said shunt current supplied through said current sensing resistor to develop switching pulses having a width proportional to the rate of change of shunt current, said switching pulses controlling said switching means so as to alternately apply and remove said second voltage to said load terminal.

15. A power supply system for supplying a first voltage which is a selected average voltage to a load, said system comprising a first means to supply a second voltage having a level less than the first voltage, a second means to supply a third voltage which when combined with said second voltage provides a level greater than said first voltage, said second means coupled to said first means and to the load, an inductor coupled between said first and second means to develop a voltage which has a controllable polarity, a unidirectional current control element coupled from between said inductor and said second means to said load, switching means coupled between said second means and said load to be opened in response to a switching pulse, reference means coupled to said load, a voltage sensing circuit coupled to said reference means and to said load, said sensing circuit including adjustable means for selecting an average voltage to be maintained at said load, a shunt regulator coupled to said sensing means and to said load to pass a shunt current from a source thereto, said shunt regulator including a current sensing resistor coupled between said source and said load for developing a voltage indicative of the shunt current passed thereto, and a trigger circuit coupled between said shunt regulator and said switching means to respond to said shunt current to develop switching pulses having time duration indicative of the rate of change of said shunt current so as to control said switch to alternately apply and remove said second voltage to said load and to change the polarity of the voltage developed by said inductor so as to maintain the desired average voltage at said load as selected by said adjustable means.

16. A power supply circuit for supplying a voltage to a load, said circuit being capable of handling relatively large voltages, said supply circuit comprising a power source, first rectifier means coupled to said power source for developing a first voltage, second rectifier means coupled to said power source for developing a second voltage, an inductor coupled between said first and second rectifier means for limiting current supplied to said load from said first and second rectifier means, switching means coupled between said second rectifier means and said load, diode means coupled from between said inductor and said second rectifier means to said load, said first and second rectifier means and said diode means being capable of passing relatively large voltages as compared to said switching means, sensing means coupled to said load and responsive to the voltage supplied to said load, a shunt regulator coupled to said sensing means and to said load, said shunt regulator supplying varying shunt current to said load to correct for voltage variations thereon, said shunt regulator having a desired operating range of shunt current, trigger means coupled to said shunt regulator and to said switching means, said trigger means responding to the shunt current passed to the load to control said switching means so as to selectively apply said first voltage through said diode means and said first and second voltage through said switching means to said load, and to maintain said output voltage at a level so said shunt regulator operates in its desired operating range of shunt current, and overload protection means coupled between said switching means and said load and to said trigger means to thereby control said switching means in the presence of excessive current being supplied to said load so as to apply said first voltage through said diode means to prevent said switching means from passing an excessive current to said load.

17. A circuit for supplying a desired average voltage from a power source to one end of a load, regardless of variations of voltage of the power source or of load variations, the other end of the load coupled to a source of reference potential, said circuit comprising a first voltage source coupled to said power source and to said source of reference potential to develop a first voltage, said first voltage having a level less than or equal to said desired average voltage, an inductor coupled to said first voltage source, said inductor developing a third voltage being controllable to vary in polarity, a second voltage source coupled to said inductor and to said load to develop a second voltage and form a first supply path for applying said first, second and third voltages to said load, said first and second voltages having a combined level greater than said desired average voltage, switching means coupled between said second voltage source and said load to control said first supply path, said third voltage changing in polarity in response to said switching means being open or closed, a diode coupled from between said inductor and said second source to said load to provide a second supply path to apply said first and third voltage to said load, sensing means coupled between said load and said source of reference potential, shunt regulator means coupled between said sensing means and said load for supplying shunt current thereto in response to the voltage supplied to said load, and a bistable trigger circuit coupled between said shunt regulator means and said switching means to respond to said shunt current for controlling said switching means to alternately apply voltage to said load through said first supply path which is equal to said first and second voltages minus said third voltage and through said second path which is equal to said first and third voltages, to thereby maintain said desired average voltage at said load.

References Cited in the file of this patent

UNITED STATES PATENTS

| | | |
|---|---|---|
| 2,897,433 | Putkovich et al. | July 28, 1959 |
| 2,903,639 | Mezaros | Sept. 8, 1959 |

UNITED STATES PATENT OFFICE

CERTIFICATE OF CORRECTION

Patent No. 3,040,183 June 19, 1962

Robert P. Farnsworth

It is hereby certified that error appears in the above numbered patent requiring correction and that the said Letters Patent should read as corrected below.

Column 12, line 56, for "$E_1$ and $E_2$" read -- $E_1$ plus $E_2$ --; column 17, line 53, for "surplus" read -- supply --.

Signed and sealed this 30th day of October 1962.

(SEAL)
Attest:

ERNEST W. SWIDER
Attesting Officer

DAVID L. LADD
Commissioner of Patents